(12) United States Patent
Mathias

(10) Patent No.: US 6,298,985 B1
(45) Date of Patent: Oct. 9, 2001

(54) COMPACT DISC PACKAGE

(75) Inventor: Gregory T. Mathias, Oakdale, MN (US)

(73) Assignee: Americraft Carton, Inc., St. Paul, MN (US)

(*) Notice: Subject to any disclaimer, the term of this patent is extended or adjusted under 35 U.S.C. 154(b) by 0 days.

(21) Appl. No.: 09/577,784

(22) Filed: May 24, 2000

(51) Int. Cl.⁷ .................................................. B65D 85/57
(52) U.S. Cl. .................................. 206/308.1; 206/782
(58) Field of Search .................................. 206/303, 307, 206/307.1, 308.1, 308.3, 312, 775, 776, 782; 229/68.1, 70, 72

(56) References Cited

U.S. PATENT DOCUMENTS

| | | |
|---|---|---|
| D. 386,406 | 11/1997 | House . |
| D. 394,387 | 5/1998 | Williams . |
| 4,971,195 | 11/1990 | Mitsuyama . |
| 5,248,032 | 9/1993 | Sheu et al. . |
| 5,662,217 | 9/1997 | Durr . |
| 5,749,463 * | 5/1998 | Collins .............................. 206/308.1 |
| 5,833,063 * | 11/1998 | Ho ..................................... 206/308.1 |
| 5,901,843 * | 5/1999 | Gambardella et al. ........... 206/308.1 |
| 5,938,022 * | 8/1999 | Detloff .............................. 206/308.1 |
| 6,016,907 * | 1/2000 | Dreier ................................. 206/232 |

FOREIGN PATENT DOCUMENTS

| | | |
|---|---|---|
| 239183 | 9/1986 | (DE) . |
| 1497330 | 1/1978 | (GB) . |
| 679772 | 1/1965 | (IT) . |

* cited by examiner

*Primary Examiner*—Jim Foster
(74) *Attorney, Agent, or Firm*—Hugh D. Jaeger

(57) ABSTRACT

A compact disc package made of a stiff paperboard blank having three panels, which when folded and adhered, create a pocket for holding a compact disc. There are semicircular windows which when aligned show a portion of the compact disc enclosed in the package. Also provided is an integral tab which holds the compact disc in place and prevents the compact disc from slipping out of the package. This compact disc package can be used for mailing or storing compact discs.

1 Claim, 2 Drawing Sheets

COMPACT DISC PACKAGE

CROSS REFERENCES TO CO-PENDING APPLICATIONS

None.

BACKGROUND OF THE INVENTION

1. Field of the Invention

The present invention is for a compact disc package made of stiff paperboard for mailing and/or storing a compact disc.

2. Description of the Prior Art

None.

SUMMARY OF THE INVENTION

The general purpose of the present invention is to provide an improved compact disc package.

According to one embodiment of the present invention, there is provided a stiff paperboard blank, including three square panels connected end-to-end such that there is a center panel and two end panels attached to the center panel along fold lines. The center panel includes two flaps which fold inwardly. One of the end panels folds over the inwardly folded flaps and is adhered to the flaps, thus creating a pocket for receiving a compact disc. The other end panel then folds inwardly over the first folded end panel to complete the package. Both end panels include semicircular-shaped windows which align with each other when the end panels are in their folded position so that a section of the compact disc can be seen through the package. There is also an integral tab on the first folded end panel which prevents the compact disc from slipping out of the pocket.

One significant aspect and feature of the present invention is a one-piece blank which is folded and adhered to create a pocket.

Another significant aspect and feature of the present invention is an integral tab which prevents the compact disc from slipping out of the pocket.

Still another significant aspect and feature of the present invention is a set of aligned windows which allow the user to see a portion of the contained compact disc.

Having thus described an embodiment and significant aspects and features of the present invention, it is the principal object of the present invention to provide an improved compact disc package.

One object of the present invention is to provide an inexpensive way to package compact discs for storage or mailing.

Another object of the present invention is to provide a means to prevent the compact disc from slipping out of the pocket.

Yet another object of the present invention is to provide windows so the user can identify the contained compact disc without opening the package.

Still another object of the present invention is to provide a pocket for receiving a compact disc using a single stiff paperboard blank.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
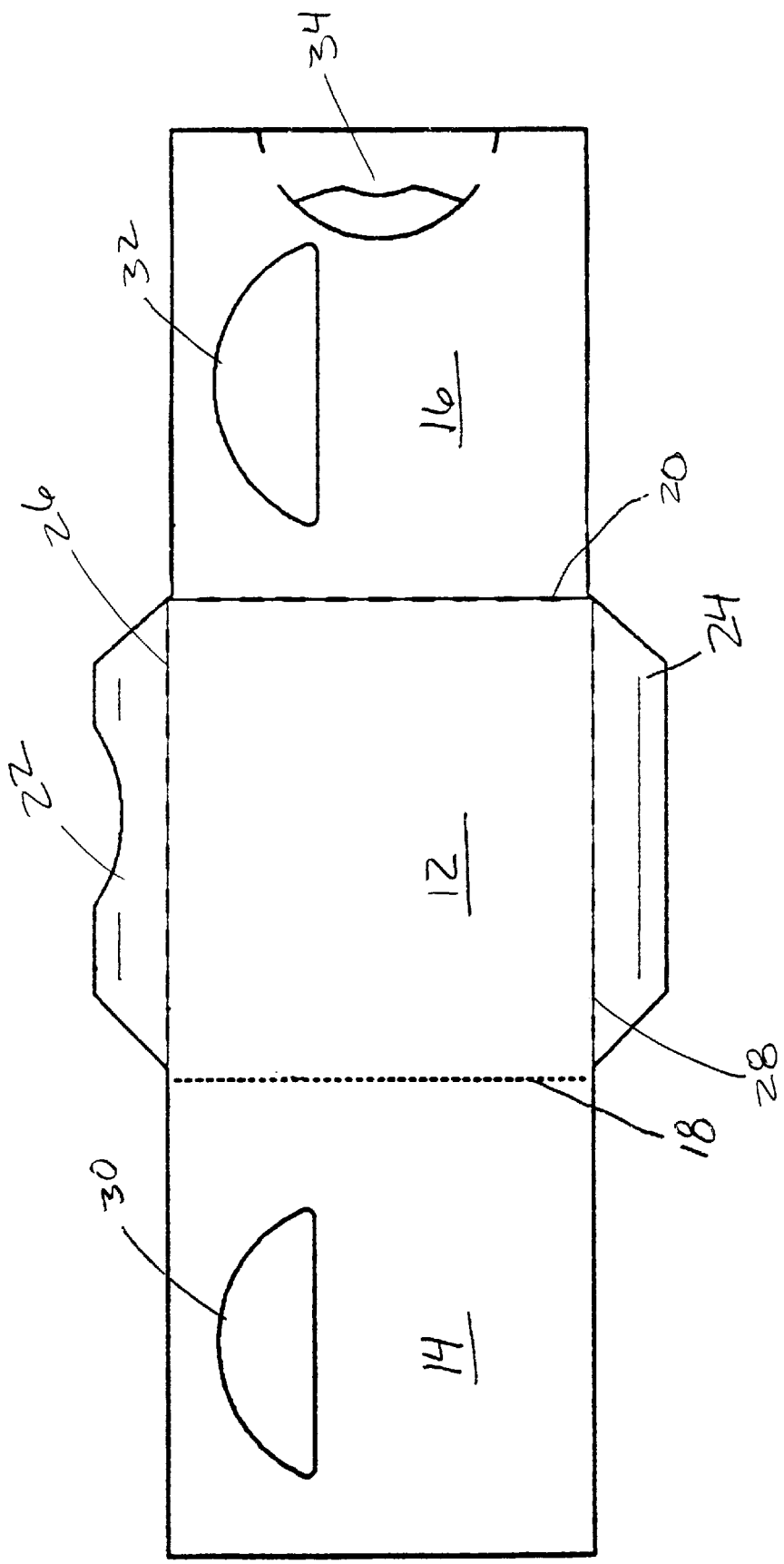
FIG. 1 illustrates a front view of the blank for a compact disc package, the present invention; and, FIG. 2 illustrates a front view of the compact disc package in use.

FIG. 1 illustrates a front view of a compact disc package 10 which is formed from a stiff paperboard blank which has three square panels connected end-to-end such that there is a center panel 12 and two end panels 14 and 16 attached to the center panel 12 along fold lines 18 and 20. The center panel 12 includes two flaps 22 and 24 which fold inwardly along fold lines 26 and 28, respectively. End panel 16 is folded inwardly over the inwardly folded flaps 22 and 24 and is adhered to the flaps 22 and 24, thus creating a pocket for receiving a compact disc. End panel 14 then folds inwardly over end panel 16 to complete the compact disc package 10. The end panels 14 and 16 include semicircular-shaped windows 30 and 32, one in each panel. The windows 30 and 32 align with each other when end panels 14 and 16 are folded to their final position so that a segment of the compact disc can be seen through the aligned windows 30 and 32. End panel 16 has an integral tab 34 which engages the compact disc when it is inserted into the pocket to keep the compact disc from slipping out of the pocket.

MODE OF OPERATION

Figure 2:
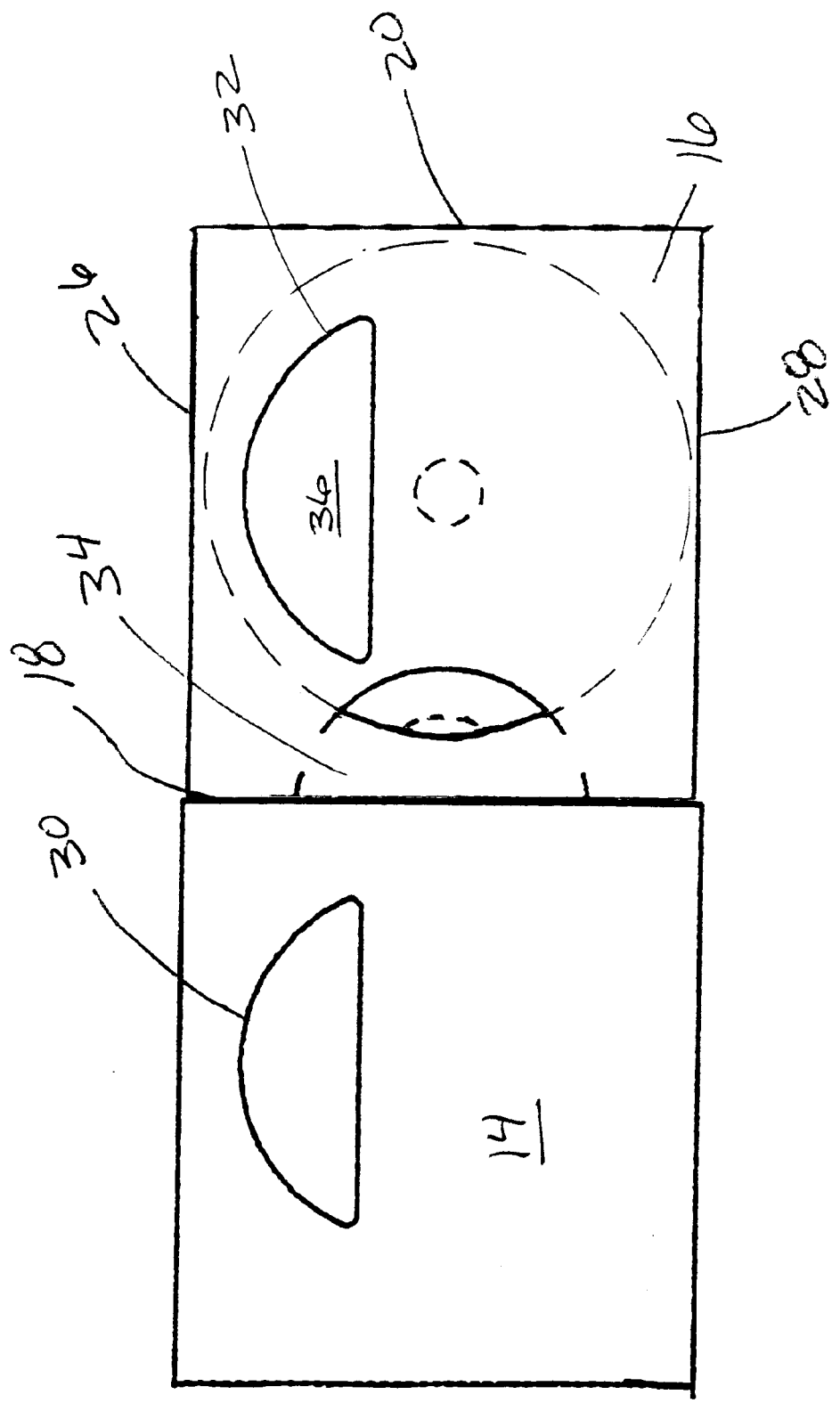

FIG. 2 illustrates a front view of the compact disc package in use, where all numerals correspond to those elements previously described. Illustrated in particular is the offset position of a compact disc 36 which is frictionally engaged by tab 34. Center panel 12 is not labeled, but it is understood that center panel 12 is located under end panel 16 and compact disc 36. The scope of the invention is not limited to compact discs, as the present invention can easily be modified to hold record albums, laser discs or any other flat, circular objects.

Various modifications can be made to the present invention without departing from the apparent scope hereof.

It is claimed:

1. A compact disc package comprising:
   a. a stiff paperboard blank which has three square panels connected end-to-end such that there is a center panel and two end panels attached to the center panel along fold lines;
   b. the center panel includes two flaps which fold inwardly;
   c. one of the end panels folds over the inwardly folded flaps and is adhered to the flaps, thus creating a pocket for receiving a compact disc;
   d. the other end panel then folds over the first folded end panel to complete the package;
   e. both of the end panels include a semicircular-shaped window and the windows align with each other when the panels are in their folded position so that a segment of the compact disc can be seen through the aligned windows; and,
   f. the end panel which is first folded over the center panel and is adhered to the flaps has an integral retaining tab which engages the compact disc when it is inserted into the pocket to keep the disc from slipping out of the pocket.

* * * * *